United States Patent
Foster et al.

(10) Patent No.: US 9,857,195 B2
(45) Date of Patent: Jan. 2, 2018

(54) SELECTION AND PRESENTATION OF GEOGRAPHIC CONTENT IN AN AUTOMOTIVE ENVIRONMENT

(71) Applicant: GOOGLE INC., Mountain View, CA (US)

(72) Inventors: Andrew Foster, Naremburn (AU); Nicholas Julian Pelly, Manly (AU); Michael Graham Woodward, Ultimo (AU)

(73) Assignee: GOOGLE INC., Mountain View, CA (US)

( * ) Notice: Subject to any disclaimer, the term of this patent is extended or adjusted under 35 U.S.C. 154(b) by 257 days.

(21) Appl. No.: 14/291,987

(22) Filed: May 30, 2014

(65) Prior Publication Data

US 2015/0345983 A1    Dec. 3, 2015

(51) Int. Cl.
*G01C 21/12* (2006.01)
*G01C 21/10* (2006.01)
*G01C 21/36* (2006.01)

(52) U.S. Cl.
CPC ....... *G01C 21/3682* (2013.01); *G01C 21/362* (2013.01); *G01C 21/3617* (2013.01)

(58) Field of Classification Search
CPC .... G01C 21/34; G01C 21/26; G01C 21/3647; G01C 21/3682; G01C 21/3492; G01C 21/32; G01C 3/085; G01C 21/3415; G01C 3/08; G06F 17/24; G06F 17/21; G06F 15/173; G06F 21/56; G06F 15/17306; G06F 17/30699; G06F 17/30943

USPC ......... 701/424, 119, 414, 36, 533, 117, 1, 2, 701/103, 409, 23, 41, 521, 408
See application file for complete search history.

(56) References Cited

U.S. PATENT DOCUMENTS

| 7,831,384 | B2 * | 11/2010 | Bill | G01C 21/3407 340/995.14 |
| 7,904,219 | B1 * | 3/2011 | Lowrey | G01C 21/26 701/32.3 |

(Continued)

FOREIGN PATENT DOCUMENTS

| EP | 1 830 159 A1 | 9/2007 |
| WO | WO-2013/192583 A1 | 12/2013 |

OTHER PUBLICATIONS

International Preliminary Report on Patentability for Application No. PCT/US2015/033241, dated Dec. 6, 2016.

(Continued)

*Primary Examiner* — Jelani Smith
*Assistant Examiner* — Luis A Martinez Borrero
(74) *Attorney, Agent, or Firm* — Marshall, Gerstein & Borun LLP (57) ABSTRACT

A request for geographic content is received from a client device. The request includes (i) an indication that a user invoked the digital mapping service in a vehicle and (ii) an identifier of the user. In response to the request, profile data for the user is automatically retrieved. The profile data includes indications of previous interactions of the user with a digital mapping service. Geographic content then is generated based on the indications of previous interactions in view of relevance of the previous interactions to an automotive context. The generated geographic content is provided to the client device for presentation in the vehicle.

13 Claims, 4 Drawing Sheets

(56) References Cited

U.S. PATENT DOCUMENTS

| | | | | |
|---|---|---|---|---|
| 8,260,553 B2* | 9/2012 | Klein | G01C 21/20 | 701/424 |
| 8,285,551 B2* | 10/2012 | Gazdzinski | G06Q 30/0251 | 187/396 |
| 8,417,453 B2* | 4/2013 | Masuda | G01C 21/32 | 340/988 |
| 8,442,768 B2* | 5/2013 | Sasaki | G01C 21/26 | 340/990 |
| 8,458,102 B2* | 6/2013 | Bill | G01C 21/3617 | 706/11 |
| 8,463,488 B1* | 6/2013 | Hart | G07C 5/008 | 340/576 |
| 8,538,686 B2* | 9/2013 | Gruen | G01C 21/3617 | 190/102 |
| 8,549,105 B1* | 10/2013 | Nourse | G01C 21/32 | 707/706 |
| 8,626,136 B2* | 1/2014 | Ozzie | G06F 17/30867 | 455/414.2 |
| 8,855,901 B2* | 10/2014 | Leader | G01C 21/3617 | 701/117 |
| 9,652,474 B2* | 5/2017 | Lei | G06F 17/30241 | |
| 2004/0148095 A1* | 7/2004 | Katou | G01C 21/3484 | 701/410 |
| 2007/0010942 A1* | 1/2007 | Bill | G01C 21/3679 | 701/424 |
| 2007/0299599 A1* | 12/2007 | Letchner | G01C 21/3484 | 701/424 |
| 2009/0005963 A1* | 1/2009 | Jarvinen | G01C 21/3438 | 701/533 |
| 2010/0161214 A1* | 6/2010 | Singh | G01C 21/3641 | 701/424 |
| 2010/0185663 A1* | 7/2010 | Lei | G06Q 30/02 | 707/769 |
| 2010/0324818 A1* | 12/2010 | Gellatly | G01C 21/3641 | 701/431 |
| 2010/0332130 A1* | 12/2010 | Shimizu | G01C 21/3617 | 701/533 |
| 2011/0106436 A1* | 5/2011 | Bill | G01C 21/3407 | 701/467 |
| 2011/0172904 A1* | 7/2011 | Dayaratne | G01C 21/3484 | 701/533 |
| 2011/0288762 A1* | 11/2011 | Kuznetsov | G01C 21/32 | 701/532 |
| 2011/0291863 A1* | 12/2011 | Ozaki | G01C 21/3682 | 340/995.14 |
| 2012/0166464 A1* | 6/2012 | Honkola | G06F 17/3097 | 707/758 |
| 2012/0190379 A1* | 7/2012 | Hassan | H04W 24/00 | 455/456.1 |
| 2012/0239584 A1* | 9/2012 | Yariv | G01C 21/3438 | 705/319 |
| 2013/0066548 A1* | 3/2013 | Gruen | G01C 21/3617 | 701/410 |
| 2013/0128060 A1* | 5/2013 | Rhoads | G01C 21/20 | 348/207.1 |
| 2013/0158873 A1 | 6/2013 | Rhee et al. | | |
| 2013/0325319 A1* | 12/2013 | Moore | G01C 21/36 | 701/412 |
| 2013/0325341 A1* | 12/2013 | van Os | G01C 21/3611 | 701/533 |
| 2013/0325343 A1* | 12/2013 | Blumenberg | G01C 21/00 | 701/533 |
| 2013/0326425 A1* | 12/2013 | Forstall | G01C 21/3638 | 715/851 |
| 2013/0332113 A1* | 12/2013 | Piemonte | H04M 1/72569 | 702/189 |
| 2013/0345957 A1* | 12/2013 | Yang | G06N 5/02 | 701/300 |
| 2014/0005924 A1* | 1/2014 | Letz | G01C 21/343 | 701/424 |
| 2014/0310788 A1* | 10/2014 | Ricci | B60Q 1/00 | 726/6 |
| 2014/0365126 A1* | 12/2014 | Vulcano | G01C 21/36 | 701/533 |

OTHER PUBLICATIONS

International Search Report and Written Opinion for Application No. PCT/US2015/033241, dated Aug. 27, 2015.

* cited by examiner

SELECTION AND PRESENTATION OF GEOGRAPHIC CONTENT IN AN AUTOMOTIVE ENVIRONMENT

FIELD OF TECHNOLOGY

This application generally relates to interactive digital maps and, more particularly, to generating automatic suggestions when a user interacts with a digital map.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many modern electronic devices support digital mapping services that provide interactive digital maps, navigation directions, and geographic commercial content (such as geographically relevant advertisements, for example). These digital mapping services can include client-side mapping applications and, in some cases, tasks executing on network servers. The network servers can select and provide geographic content to client devices, which may include personal computers, smartphones, and head units of vehicles. The geographic content can include responses to specific requests, results of geographic search queries, automatic suggestions, etc. In some cases, the network servers generate a large amount of content, which may take the user a long time to review.

SUMMARY

In accordance with the techniques of this disclosure, a digital mapping service determines that a client device is operating in a vehicle, selects geographic content relevant specifically to an automotive context, and provides the selected geographic content to the client device for display in the vehicle as a "car-friendly" list. In this manner, the digital mapping service minimizes unnecessary user interaction with a user interface, while in a car. The digital mapping service can provide the geographic content to the client device in response to a search query or a request for automatic suggestions, for example. The geographic content can be based at least in part on previous interactions of the user of the client device with the digital mapping service. These interactions can include, for example, previous requests for navigation directions, previous searches, reviews of businesses, etc. In some embodiments, the user operates certain controls and/or installs certain applications to allow the digital mapping service to generate geographic content using this type of data.

More specifically, one embodiment of these techniques is a system including a non-transitory computer-readable medium and processing hardware coupled to the non-transitory computer-readable medium. The computer-readable medium stores profile data for a registered user, where the profile data including indications of previous interactions of the user with a digital mapping service. The processing hardware is configured to (i) receive a request for geographic content from a client device, where the request includes an indication that the user invoked the digital mapping service in a vehicle, (ii) in response to the request, automatically generate geographic content based at least in part on the indications of previous interactions, including select the geographic content in view of its relevance to an automotive context, and (iii) provide the geographic content to the client device for presentation in the vehicle.

Another embodiment is a method for providing geographic content in an automotive context. The method includes receiving a request for geographic content from a client device, where the request includes (i) an indication that a user invoked the digital mapping service in a vehicle and (ii) an identifier of the user. The method also includes automatically retrieving, in response to the request, profile data for the user, the profile data including indications of previous interactions of the user with a digital mapping service. The method further includes generating geographic content based on the indications of previous interactions in view of relevance of the previous interactions to an automotive context, and providing the geographic content to the client device for presentation in the vehicle.

Yet another embodiment is a computing device includes a network interface to communicate with a network server providing a digital mapping service, and processing hardware coupled to the network interface. The processing hardware is configured to (i) determine that the computing device is currently operating in a vehicle, (ii) send, via the network interface, a request for geographic content to the network server, where the request includes an indication that the computing device is currently operating in the vehicle and identity of a user operating the computing device, (iii) receive, via the network interface, geographic content automatically generated at the network server based on indications of previous interactions of the user with the digital mapping service, in view of relevance of the geographic content to an automotive context, and (iv) provide the geographic content to the user via a user interface.

DETAILED DESCRIPTION

Overview

Generally speaking, when a system of this disclosure determines that a registered user is interacting with a digital mapping service in an automotive environment, the system adjusts the selection of automatically generated geographic content so as to make this information more relevant to the automotive environment. To interact with the digital mapping service, the registered user can invoke a mapping software executing in a head unit of a vehicle or in a portable device, for example. In some cases, the portable device can be connected to the head unit of the vehicle via a short-range communication link, so that the user can interact with the digital mapping software executing on the portable device via the user interface embedded in the head unit. Portable, embedded, and other devices that can execute mapping software are collectively referred to in this application as "client devices." The user of a client device is referred to below as the driver of the car, but in general the user and the driver need not be the same person.

In an example implementation, a content server stores the driver's profile data that includes indications of past categorical searches, searches for specific businesses, reviews of businesses, requests for driving directions, etc. These indications can be stored with respective timestamps. The digital mapping software can request a list of recent queries, new search results, or personalized suggestions from the system for display in the vehicle. The request can include an indication that a client device is operating in a vehicle and, when the user drives several vehicles, an indication of which of the several vehicles the user is currently driving. In some embodiments, the user operates certain controls and/or installs certain applications on the client device to allow the content server to generate geographic content using this type of data.

In response, the system can "filter" the profile data to prioritize information related to driving in general and to the current context of the client device (e.g., the current location, the navigation route, the identity of the vehicle) in particular. The system can lower the priority of the data that probably has little or no relevance to present driving context and, in some cases, not provide this information to the portable device at all. For example, a certain driver typically may drive only to destinations within ten miles of her current location. The driver is unlikely to be interested in a destination outside of this range, and thus the system deprioritize data related to locations farther than ten miles from the current location of the driver.

Example Communication Systems, Devices, and Methods

An example system that generates geographic content in view of the automotive context is discussed next, followed by a discussion of an example portable device and an example content server that can operate in this system.

Figure 1:
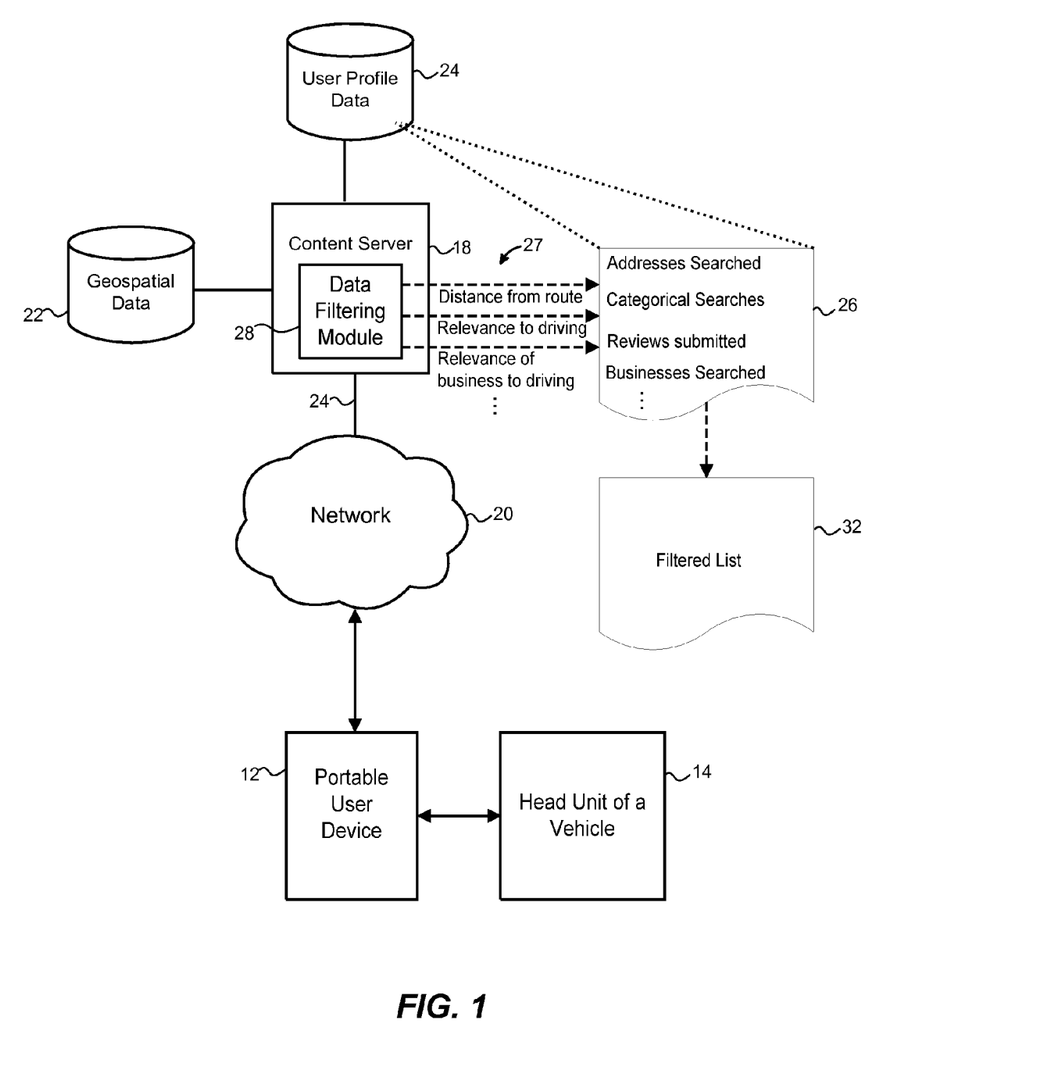
FIG. 1 is a block diagram of an example system for generating geographic content relevant to an automotive context, to present to the user.

Referring first to FIG. 1, an example system 10 includes a portable user device 12 in communication with a head unit 14 of a vehicle via a short-range communication wired link such as Universal Serial Bus (USB) or a wireless link such as IEEE 802.15 (Bluetooth®) or Wi-Fi Direct®. Additionally, the portable user device 12 communicates with a content server 18 via a communication network 20, which can be a wide area network such as the Internet. The content server 18 is coupled to a geospatial database 22 and a user profile database 24.

The portable user device 12 can be a portable computing device such as a smartphone or a tablet computer, for example. An example implementation of the portable device 12 is discussed with reference to FIG. 2A. The content server 18 can be implemented as a single device or a group of servers (e.g., a set of front-end servers and a set of back-end servers). The corresponding databases 22 and 24 can be implemented in any suitable manner, such as relational databases implemented in dedicated storage devices, dedicated groups of storage devices, or on the server 18, for example. The content server contains a data filtering module 28 that prioritizes and assesses the relevance of user profile data 26 in view of the automotive context. An example implementation of the content server 18 is discussed with reference to FIG. 2B.

In operation, the portable device 12 determines that it is operating in an automotive environment. For example, the driver can explicitly direct output of the mapping software operating in the portable device 12 to the head unit 14 by operating appropriate user interface controls, or implicitly direct the output to the head unit 14 by connecting the devices 12 and 14 with a USB cable. The portable user device 12 then transmits, to the content server 18, an indication that a digital mapping service has been invoked in an automotive context, the current location of the portable device 12, and an identifier of the driver, according to an example implementation. The indication can also include an identifier of the head unit 14 associated with the vehicle. The identifier can be any suitable number or alphanumeric string sufficiently unique to the head unit 14 and/or the vehicle in which the head unit 14 is installed. For example, the identifier can be the serial number of the head unit 14 or the Media Access Control (MAC) address of the USB port on the head unit 14.

The content server 18 identifies the user profile data 26 stored in the user profile database 24 associated with the driver. The user profile data 26 includes indications of past interactions of the user with a digital mapping service, which may include a chronologically ordered list of addresses searched, categorical searches, reviews submitted, business searched, etc. The user profile data 26 may also include locations that the driver frequently visits while using the vehicle associated with the head unit. The content server 18 also identifies relevant geospatial data stored in the geospatial database 22 as it pertains to the current location of the portable device and the user profile data 26.

The data filtering module 28 filters the user profile data 26 based on its relevance to the automotive context to generate a car-friendly filtered list 32. To assess relevance to the automotive context, the data filtering module 28 can use a set of signals 27 that can include such signals as distance from the route being driven, relevance to driving, etc. For example, locations in the user profile data 26 may include destinations that are unreachable by car. The data filtering module 28 accordingly may exclude the unreachable location from the filtered list 32. In another example, the data filtering module 28 may determine that the driver usually visits destinations within a ten-mile radius of the current location of portable user device 12, and accordingly deprioritize or exclude destinations outside of the-ten mile radius from the filtered list 32. As another example, because a driver frequently drives to a certain destination, the data filtering module 28 may assign a higher priority to that destination within the filtered list 32. Further, the data filtering module 28 may assign priorities and/or exclude geographic content in view of other factors, such as, for example, distance from a current driving route, type of interaction with the digital mapping service associated with the location (e.g. seeking directions to a location may be more relevant than reviewing a business), and relevance of the business to the driving context (e.g. a gas station is highly relevant to the driving context).

The data filtering module 28 may also filter the user profile data 26 based on the identifier of the head unit 14 associated with the vehicle. A driver may have a tendency to drive to different locations in different vehicles. For example, a driver may use one car to drive to work on weekdays and a separate vehicle to drive the family on weekends. In this case, when the data filtering module 28 determines that the driver is using the first car, the driver's office may appear near the top of the filtered list 32. However, when the vehicle filtering service 28 determines that the driver is using the second car, the data filtering module 28 may deprioritize or even exclude the office from the filtered list 32. The data filtering module 28 may weigh these and other factors differently when determining the relevance of a destination to the automotive context.

After generating the filtered list 32, the content server 18 can transmit geographic content in accordance with the filtered list 32 to the portable user device 12. More particularly, the content server 18 can transmit the geographic content in the form of an ordered list (corresponding to the order of the filtered list 32), with each entry including a geographic search term, an identifier of a geographic location, the name and address of a business, etc. In some cases, the geographic content can include more robust data such as detailed descriptions of businesses and destinations, images, audio announcements, etc. Depending on the scenario, the portable user device 12 can display or playback the geographic content via the user interface of the portable device 12 or via the head unit 14. The driver can scroll through the geographic content using finger gestures, voice commands, or by operating hardware buttons, for example.

In another implementation, digital mapping and navigation software can be implemented in the head unit 14. In this case, the head unit 14 can directly communicate with the content server 18, and the portable user device 12 need not be used at all.

Figure 2A:
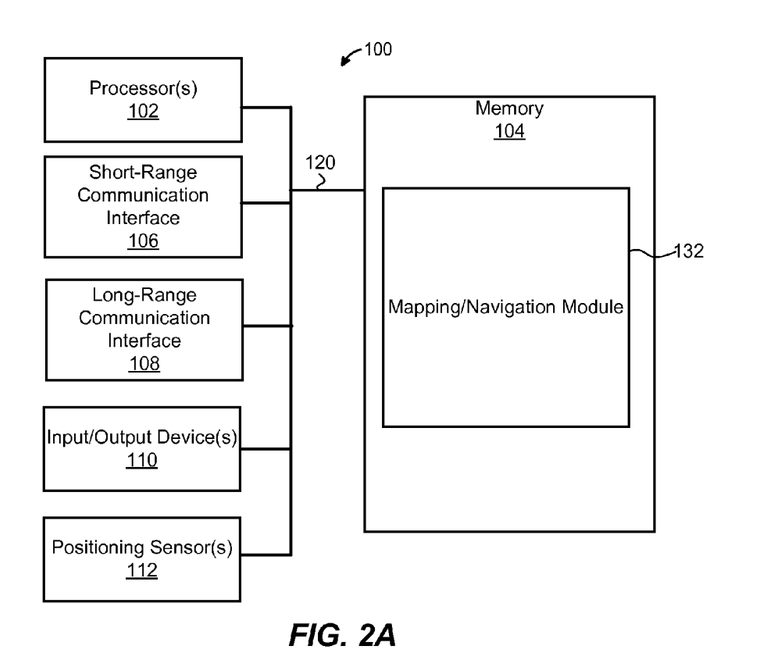
FIG. 2A is a block diagram of an example portable device that can operate in the system of FIG. 1.

Now referring to FIG. 2A, a portable user device 100 can operate in the communication system 10 (as the portable user device 12, for example) or in another suitable computing environment. The user device 100 includes processing hardware such as one or more processor(s) 102, such as a central processing unit (CPU), coupled to a memory 104. The memory 104 can include one or several persistent memory modules such as a flash memory, hard disc, optical disc, etc. and/or one or several non-persistent memory modules such as a Random Access Memory (RAM) module, readable by the processor(s) 102. In some implementations, the one or more processor(s) also include a Graphics Processing Unit (GPU) to more accurately and efficiently render graphics content. Further, the user device 100 can include a wired and/or wireless short-range communication interface 106 that supports a scheme such as Bluetooth®, Wi-Fi Direct®, or USB, and a long-range communication interface 108 that supports a scheme such as 802.11 (Wi-Fi®) or a suitable telephony protocol, for example.

The user device 100 further includes input and output device(s) 110 such as a touchscreen, a microphone, a non-touch screen, a keyboard, a mouse, speakers, etc. Further, the user device 10 in this example implementation includes positioning sensor(s) 112 which may include a GPS sensor and/or a proximity sensor, for example. The user device 100 in some embodiments can determine its current location using the communication 106 and 108 to locate Wi-Fi hotspots having known positions and perform triangulation. The components 102-112 can be interconnected via a digital bus 120, for example.

The memory 104 stores a mapping/navigation module 132 that provides geographic data to a vehicle and, in some cases, receives data from the vehicle. In some embodiments, the mapping/navigation module 132 operates as a digital mapping module that generates an interactive digital map for display via a screen of the portable device 100 and/or the head unit of a vehicle. To this end, the user device 100 can receive geographic data in vector and/or raster format, as well as filtered lists of suggested destinations, from a content server, such as the content server 18 of FIG. 1. The mapping/navigation module 132 can include compiled instructions, non-compiled instructions interpreted by another software module, or both. The mapping/navigation module 132 can be, for example, a standalone application, library, or a plugin.

The mapping/navigation module 132 is further configured to receive an indication a digital mapping service is invoked and a vehicle identifier via the short-range communication interface 106, provide the indication and vehicle identifier to a content server (such as the server 18) via the long-range communication interface 108, and receive a filtered list of suggestion destinations and the relevant geographic content. When the mapping/navigation module 132 receives geographic content organized into a filtered list, the mapping/navigation module 132 can display at least a portion of the filtered list. Example operation of the mapping/navigation module 132 is further discussed with reference to FIG. 4.

Figure 2B:
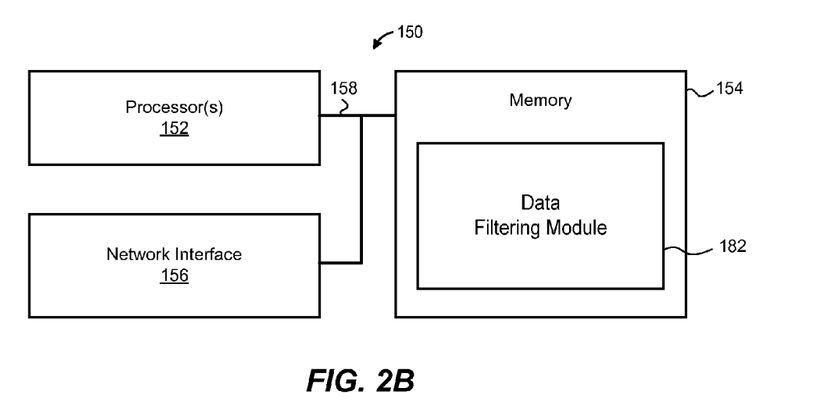
FIG. 2B is a block diagram of an example server that can operate in the system of FIG. 1.

Next, FIG. 2B illustrates an example content server 150 which can operate as the content server 18 of FIG. 1, for example. The server 150 includes processing hardware including one or more processor(s) 152 coupled to a memory 154. The example server 150 also includes a network interface 156 and a digital bus 158 via which the components of the server 150 are interconnected. The memory 154 stores a data filtering module 182, which can be similar to the data filtering module 28 discussed above. The service 182 can be implemented, for example, using software instructions executable on the processor(s) 152.

In an example scenario, the vehicle filtering service 182 receives an indication that a digital mapping service has been invoked in an automotive context, a user name associated with the driver, and a vehicle identifier. The service 182 can access a user profile database that may be coupled to the content server 150. The user profile database may also be implemented in the memory 154. The vehicle filtering service 182 generates a filtered list of suggested destinations to be transmitted to a portable user device. Example operation of the service 182 is further discussed with reference to FIG. 3.

Referring generally to FIGS. 2A and 2B, it will be understood that the portable user device 100 and the content server 150 can include additional components or, conversely, be implemented without some of the illustrated components. Further, two or more of the illustrated components can be implemented as a single component. Still further, some of the components illustrated as single blocks can be made up of multiple interconnected components.

Figure 3:
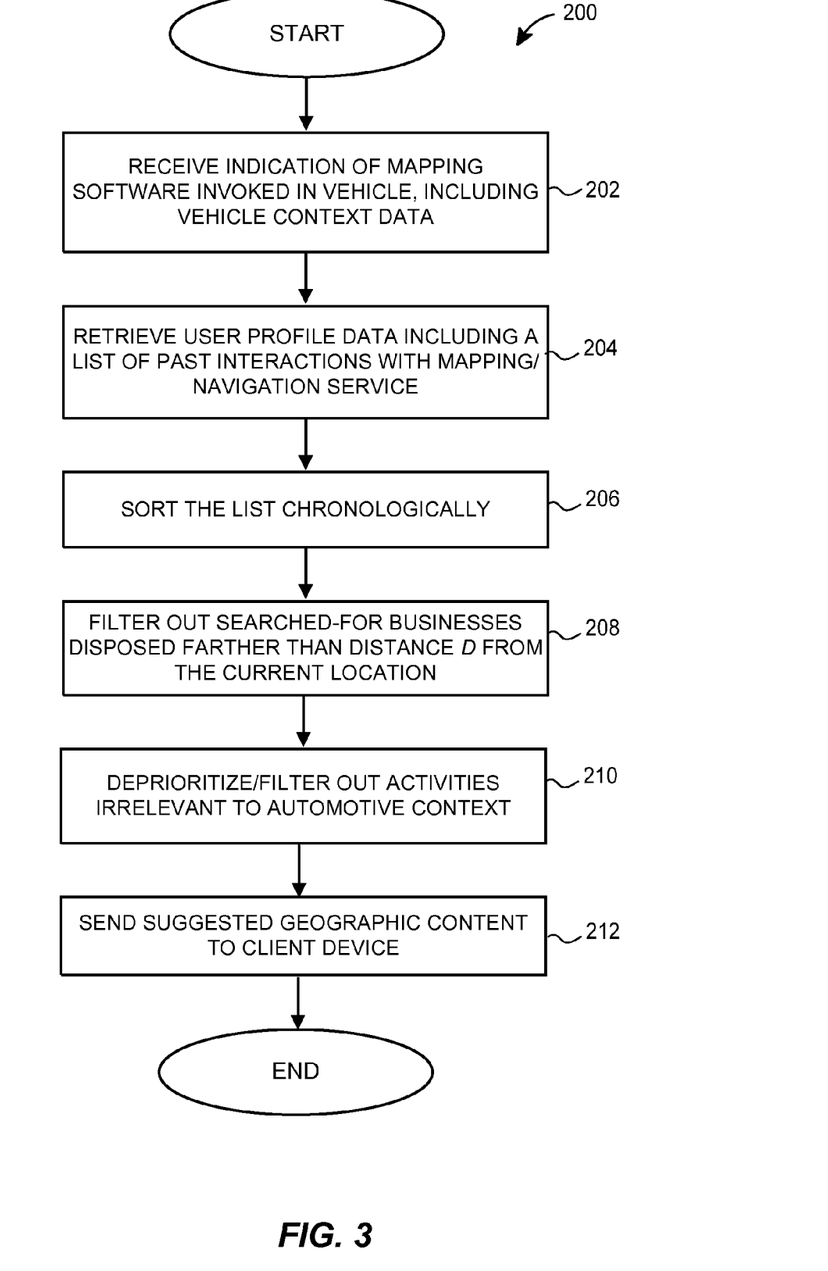
FIG. 3 is a flow diagram of an example method for communicating to a user a filtered list of automatically generated geographic content, which can be implemented in the server in FIG. 1.

FIG. 3 illustrates an example method 200 for communicating to a user a filtered list of automatically generated geographic content. The method 200 can be implemented in the content server 18 of FIG. 1 as a set of computer instructions, for example.

At block 202, an indication that a mapping software was invoked in a vehicle is received. As discussed above, the indication can include vehicle context data including at least some of the following parameters: the identifier of the user as recognized by the digital mapping service, the current location of the vehicle, an identifier of the vehicle (when the user drives multiple vehicles). In some cases, the indication is received along with a request for geographic content, which may be explicit (e.g., "provide recent geographic search queries of the user" or "provide automatic suggestions") or implicit (e.g., "provide navigation directions from the current location to Sydney").

At block 204, user profile data indicative of the user's past interactions with the digital mapping is retrieved, including time-stamped reviews, searches, requests for navigation directions, etc. Next, at blocks 206-210, the profile data is selected and organized into a car-friendly list. In particular, the list of indications of past user's interactions is sorted chronologically at block 206. Data related to searched-for businesses that are disposed farther than a certain distance D from the current location of the vehicle is filtered out at block 208. In a similar manner, business reviews and other activities related to locations disposed farther than distance D can be filtered out. At block 210, activities that are likely to be irrelevant to the automotive context are deprioritized and/or filtered out. For example, reviews of businesses may be filtered out while navigation directions may be retained.

It is noted that the method 200 can include activities related to selecting and prioritizing geographic content in addition to the actions discussed with reference to blocks 206-210. For example, geographic content can be further filtered in view of the specific vehicle the user is driving.

At block 212, the suggested geographic content is sent to the client device, in accordance with the list generated at blocks 206-210.

Figure 4:
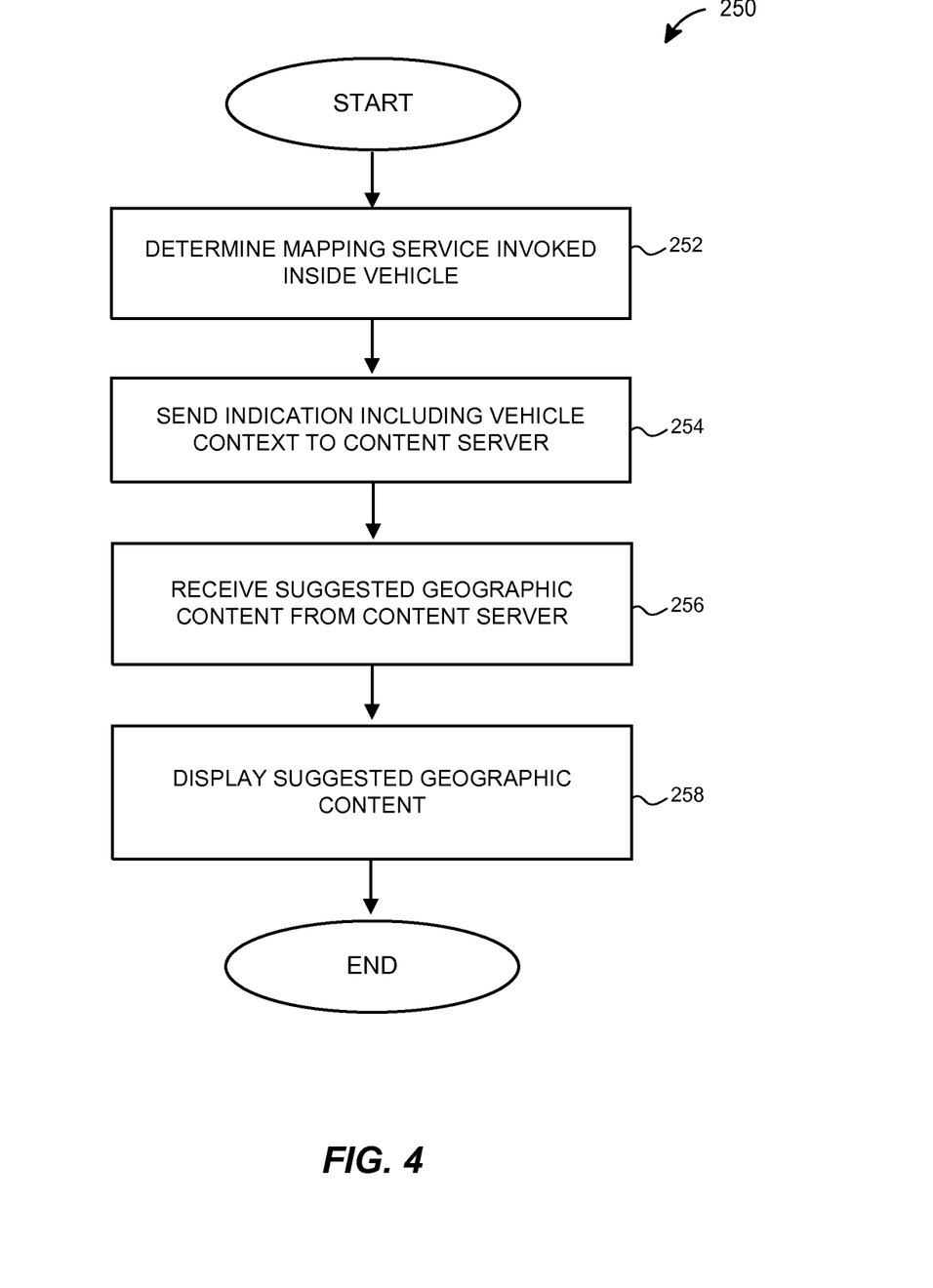
FIG. 4 is a flow diagram of an example method for displaying a filtered list of automatically generated geographic content, which can be implemented in the portable device in FIG. 1.

Next, FIG. 4 illustrates an example method 250 for displaying a filtered list of automatically generated geographic content, which can be implemented in the portable device in FIG. 1, for example. Similar to the method 200, the method 250 can be implemented as a set of instructions stored on a non-transitory computer-readable medium and executable one or more processors.

The method 250 begins at block 252, where it is determined that a mapping service was invoked in a vehicle. For example, a mapping application operating in a smartphone can determine that the user chose to direct output to the head unit of a vehicle. An indication of the current automotive context is sent to the server at block 254. Depending on the scenario, the indication can be sent as part of a request for automatic suggestions, a request for a list of recent activities, a request for navigation directions, etc. The indication of the current automotive context can include an identifier of the user, an identifier of the vehicle, the current location of the vehicle, an indication of current speed, etc. The geographic content is then received in response to the sent indication at block 256, and displayed at block 258.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for generating geographic content for use in a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:
1. A system comprising:
 a non-transitory computer-readable medium storing thereon profile data for a registered user, the profile data including indications of previous interactions of the user with a digital mapping service; and
 processing hardware coupled to the non-transitory computer-readable medium, the processing hardware configured to:
  receive a request for geographic content from a client device, wherein the request includes an indication that the user invoked the digital mapping service while the client device is coupled to a head unit of a vehicle via a short-range communication link,
  in response to the request, automatically generate geographic content based at least in part on the indications of previous interactions, including select the geographic content in view of its relevance to an automotive context, and
  provide the geographic content to the client device for presentation in the vehicle.

2. The system of claim 1, wherein the processing hardware is further configured to:
 sort the indications of previous interactions of the user with the digital mapping service chronologically to generate an ordered list, and
 select the geographic content from the ordered list.

3. The system of claim 1, wherein to select the geographic content from the ordered list, the processing hardware is further configured to exclude, from the geographic content, information related to places disposed farther than a certain distance from a current location of the vehicle.

4. The system of claim 3, wherein the processing hardware is further configured to select, using the profile data, the certain distance in accordance with propensity of the user to drive.

5. The system of claim 1, wherein:
the indications of previous interactions of the user with the digital mapping service include (i) requests for driving directions to places within the geographic area and (ii) reviews of businesses disposed within a geographic area, and
to generate the geographic content, the processing hardware is further configured to (i) include the requests for driving directions from the geographic content and (ii) exclude the reviews of businesses in the geographic content.

6. The system of claim 1, wherein to generate the geographic content, the processing hardware is further configured to:
select, from a plurality of reviews of businesses included in the profile data, reviews of the businesses likely to be relevant to driving,
use the selected reviews of the businesses when generating the geographic content, and
exclude reviews of businesses unrelated to driving when generating the geographic content.

7. The system of claim 1, wherein the request identifies one of a plurality of vehicles with which the user is associated; and wherein the processing hardware is configured to generate the geographic content relevant specifically to the identified one of the plurality of vehicles.

8. The system of claim 1, wherein the indications of the previous interactions of the user with the digital mapping service include one or of categorical searches, searches for specific businesses, requests for driving directions, and reviews of businesses.

9. A computing device comprising:
a network interface to communicate with a network server providing a digital mapping service;
processing hardware coupled to the network interface and configured to:
determine that the computing device is currently connected to a head unit of a vehicle via a short-range communication link;
send, via the network interface, a request for geographic content to the network server, wherein the request includes (i) an indication that the computing device is currently operating in the vehicle and (ii) identity of a user operating the computing device,
receive, via the network interface, geographic content automatically generated at the network server based on indications of previous interactions of the user with the digital mapping service, in view of relevance of the geographic content to an automotive context, and
provide the geographic content to the user via a user interface.

10. The computing device of claim 9, further comprising:
a short-range communication interface to communicatively couple the computing device to the head unit of the vehicle via the short-range communication link, wherein the user interface is implemented in the head unit;
wherein the processing hardware is configured to provide the geographic content to the user interface via the short-range communication interface.

11. The computing device of claim 9, wherein:
the processing hardware is further configured to send, as part of the request for suggested geographic content, an indication of a current location of the vehicle, and
the suggested geographic content excludes information related to places disposed farther than a certain distance from the current location of the vehicle.

12. The computing device of claim 11, wherein the processing hardware is configured to send the request for geographic content in response to receiving, via the user interface, one of (i) a search query including one or more search terms, or (ii) a request for automatic suggestions.

13. The computing device of claim 9, wherein to determine that the computing device is currently operating in a vehicle, the processing hardware is configured to detect a connection to the head unit of the vehicle via the short-range communication link.

* * * * *